United States Patent [19]
Tomoda et al.

[11] Patent Number: 5,832,229
[45] Date of Patent: Nov. 3, 1998

[54] MULTICAST COMMUNICATION SYSTEM ALLOWS USER TO JOIN OR LEAVE MULTICAST GROUPS AND SPECIFY COMMUNICATION QUALITY USING EASILY COMPREHENSIBLE AND OPERABLE USER TERMINAL DISPLAY

[75] Inventors: Ichiro Tomoda; Toru Kambayashi; Satoshi Ito; Takashi Ida; Yasuhiko Shimomura; Toshiya Takahashi; Hirofumi Muratani; Masafumi Kondo, all of Tokyo, Japan

[73] Assignee: Kabushiki Kaisha Toshiba, Kawasaki, Japan

[21] Appl. No.: 687,627

[22] Filed: Jul. 26, 1996

[30] Foreign Application Priority Data

Jul. 28, 1995 [JP] Japan .................................... 7-193448

[51] Int. Cl.[6] .................................................. G06F 13/00
[52] U.S. Cl. ................................ 395/200.57; 395/200.5; 395/200.36
[58] Field of Search ............................. 395/200.72, 680, 395/200.35, 200.66, 200.57, 200.36, 200.5; 379/202; 345/327, 331, 340

[56] References Cited

U.S. PATENT DOCUMENTS

| | | | |
|---|---|---|---|
| 5,280,583 | 1/1994 | Nakayama et al. ................. | 395/200.35 |
| 5,313,408 | 5/1994 | Goto ................................... | 395/200.66 |
| 5,363,507 | 11/1994 | Nakayama et al. .................. | 345/331 |
| 5,448,738 | 9/1995 | Good et al. ......................... | 395/680 |
| 5,557,724 | 9/1996 | Sampat et al. ..................... | 345/327 |
| 5,572,582 | 11/1996 | Riddle ................................. | 379/202 |
| 5,621,429 | 4/1997 | Yamaashi et al. .................. | 345/340 |
| 5,634,011 | 5/1997 | Auerbach et al. ................. | 395/200.72 |

OTHER PUBLICATIONS

C. Heutema "Routing in the Internet", Chapter 11, 1995, pp. 235–260.

Primary Examiner—Le Hien Luu
Attorney, Agent, or Firm—Foley & Lardner

[57] ABSTRACT

The multicast communication scheme which can enable a user to easily comprehend the multicast groups existing on the network, easily carry out an operation to join a desired multicast group, and easily specify a desired communication quality. At each user terminal, a virtual space with a plurality of regions defined therein in correspondence to a plurality of multicast groups is displayed on a screen, while an information indicating a range of each region in the virtual space is stored in correspondence to an address information for a corresponding multicast group. A desired position in the virtual space on the screen is specified by an input device, and joining/leaving to/from multicast groups is controlled by using the address information stored in correspondence to a region in the virtual space which contains the desired position. The display on the screen may include a plurality of zones defined within each region in correspondence to a plurality of different communication qualities, so that a communication quality of a multicast communication to be received can be controlled according to a zone within a region in the virtual space which contains the desired position.

23 Claims, 7 Drawing Sheets

| 401 | 402 | 403 | 404 | 405 | 406 |
|---|---|---|---|---|---|
| "CINEMA 1" | 300 | 300 | 300 | 200 | 225.0.0.1 |
| "CINEMA 2" | 400 | 650 | 200 | 300 | 225.0.0.2 |
| "SHOP 1" | 100 | 650 | 200 | 300 | 225.0.0.3 |
| ----------- | ------ | ------ | ------ | ------ | ---------- |
| ----------- | ------ | ------ | ------ | ------ | ---------- |

MULTICAST COMMUNICATION SYSTEM ALLOWS USER TO JOIN OR LEAVE MULTICAST GROUPS AND SPECIFY COMMUNICATION QUALITY USING EASILY COMPREHENSIBLE AND OPERABLE USER TERMINAL DISPLAY

BACKGROUND OF THE INVENTION

1. Field of the Invention

The present invention relates to a method and a system for controlling multicast communications to be received at user terminals through a network, in which user's joining/leaving and requested quality for multicast communications are controlled.

2. Description of the Background Art

The multicast communication is a communication means for transmitting the identical communication content from one end point for sending the communication to a plurality of end points for receiving the communication by a single transmission operation. In recent years, there are many computer network applications such as an electronic conference and broadcasts of various data, which transmit data such as video data, speech data, text data, etc., simultaneously to a plurality of users. The multicast communication can be an effective communication means in realizing these applications.

The existing system which realizes the multicast communication includes a network formed by the Ethernet and computers using the UNIX operating system. The UNIX operating system provides a communication mechanism usually called a socket to the application programs. There are several types of socket, one of which is the datagram type socket which carries out the communication according to the UDP/IP protocol, and the multicast of packets from the socket of one host to the sockets of a plurality of hosts on a network can be realized by using this datagram type socket.

In general, a set of hosts which received a certain multicast is collectively referred to as a multicast group of that certain multicast. In the multicast based on UDP/IP, one network address (IP address) is allocated to one multicast group in order to identify the multicast group. In a case where an application program on a certain host tries to receive the multicast, one datagram type socket is acquired by using the socket system call of UNIX, and then an IP address of the multicast group to receive the multicast is allocated to that acquired socket. On the other hand, at the multicast transmitting side, one datagram type socket is acquired by using the socket system call of UNIX, and then an address of a desired multicast group is specified as a destination and packets are transmitted from that acquired socket. In this manner, the packets are transmitted to the hosts belonging to the specified multicast group by means of the UNIX operating system and routers of a network.

However, the conventional multicast system as described above has been associated with the following problems.

(1) The communications in different qualities cannot be provided for different receiving end points:

As for the service which provides speech data and/or video data, in general, there are users who desire high sound/image quality as well as users who don't. In the unicast communication, in general, data are encoded at several stages and necessary data are selectively transmitted according to the user's request, in order to deal with such diverse requests of users. For example, in a case of the speech data, the speech data are encoded at several stages ranging from high frequency components to low frequency components. Then, only data of the low frequency components are transmitted to those users who request only a low quality, by omitting the data of the high frequency components, whereas data of all the frequency components are transmitted to those users who request a high quality, without omitting data of the high frequency components.

In a case of the multicast communication, however, there can be a situation in which users who request a high quality service and users who request a low quality service are mixedly present in one and the same multicast session. In the conventional multicast communication, it has only been possible to provide the communication in the identical quality to all the users within one and the same multicast session, and it has been impossible to give data of low frequency components alone to some users while giving all data to the other users in one and the same multicast session.

(2) A utilization state of the multicast sessions is difficult to comprehend for a user:

This problem actually involves the following two major issues.

(a) It is difficult to comprehend an information as to what kinds of multicast sessions are existing in the network; and (b) It is difficult to comprehend an information as to what kinds of users are participating in the individual multicast session.

There are conventional multicast systems which resolve one of these two issues. For example, there is a conventional electronic conference system in which the above issue (b) is resolved by displaying a list of names of the participants on a screen. Also, there is a system call sd (session directory), in which the above issue (a) is resolved by listing names and addresses of the multicast groups existing on the network.

However, such a conventional multicast system requires a tedious operation to carry out a series of procedures to request a list of names and addresses of the multicast groups, to look through the obtained list, to select a desired multicast group from the list, and to carry out a required operation to join/leave the multicast group.

In addition, the fact that the solutions to the above issues (a) and (b) are provided by separate means is actually a hindrance to the user's easy comprehension and one of the reasons why the tedious operation procedure becomes necessary.

In other words, it is desirable to display all the information related to the above issues (a) and (b) simultaneously by a single presentation means, and to enable the user's selection therefrom, so as to make it easier for a user to comprehend and operate the multicast system. In addition, it is even more effective to also present the information as to "which user is receiving the service at what quality level" in relation to the above noted problem (1).

However, it has been difficult to present all these multi-dimensional information to a user by using the conventionally used means for listing names.

Thus, it has conventionally been difficult for a user of the multicast system to easily comprehend the multicast groups existing on the network, and easily carry out an operation to join a desired multicast group.

Moreover, it has conventionally been impossible to receive the multicast communications in different qualities at different receiving end points within the same multicast group.

SUMMARY OF THE INVENTION

It is therefore an object of the present invention to provide a method and a system for controlling multicast communications which can enable a user to easily comprehend the multicast groups existing on the network, and easily carry out an operation to join a desired multicast group.

It is another object of the present invention to provide a method and a system for controlling multicast communications which are capable of providing the multicast communications in different qualities at different receiving end points within the same multicast group.

According to one aspect of the present invention there is provided a multicast communication system for receiving a desired multicast communication for a desired multicast group from a server through a network by joining/leaving to/from multicast groups, comprising: a display device for displaying on a screen a virtual space with a plurality of regions defined therein in correspondence to a plurality of multicast groups; memory means for storing an information indicating a range of each region in the virtual space in correspondence to an address information for a corresponding multicast group; an input device for specifying a desired position in the virtual space on the screen displayed by the display device; control means for controlling joining/leaving to/from multicast groups by using the address information stored by the memory means in correspondence to a region in the virtual space which contains the desired position specified by the input device; and communication means for receiving a multicast communication for a multicast group identified by the address information used by the control means.

According to another aspect of the present invention there is provided a multicast communication system for receiving a desired multicast communication of a desired communication quality from a server through a network by specifying the desired communication quality, comprising: a display device for displaying on a screen a virtual space with a plurality of zones defined therein in correspondence to a plurality of different communication qualities; an input device for specifying a desired position in the virtual space on the screen displayed by the display device; control means for controlling a communication quality of a multicast communication to be received according to a zone in the virtual space which contains the desired position specified by the input device; and communication means for receiving a multicast communication of a communication quality as controlled by the control means.

According to another aspect of the present invention there is provided a multicast communication system for receiving a desired multicast communication for a desired multicast group from a server through a network by joining to the desired multicast group, comprising: a display device for displaying on a screen a virtual space with a plurality of regions defined therein in correspondence to a plurality of multicast groups, and an information concerning each multicast group allocated to each region in relation to a display of each region; an input device for specifying a desired position in the virtual space on the screen displayed by the display device; icon display means for displaying an icon representing a multicast communication receiving side end point on the screen displayed by the display device at the desired position specified by the input device; control means for controlling a joining to a multicast group allocated to a region in the virtual space which corresponds to the desired position on the screen at which the icon is displayed by the icon display means; and communication means for receiving a multicast communication for a multicast group with respect to which the joining is controlled by the control means.

According to another aspect of the present invention there is provided a method of multicast communication for receiving a desired multicast communication for a desired multicast group from a server through a network by joining/leaving to/from multicast groups, comprising the steps of: displaying on a screen a virtual space with a plurality of regions defined therein in correspondence to a plurality of multicast groups; storing an information indicating a range of each region in the virtual space in correspondence to an address information for a corresponding multicast group; specifying a desired position in the virtual space on the screen displayed by the displaying step; controlling joining/leaving to/from multicast groups by using the address information stored by the storing step in correspondence to a region in the virtual space which contains the desired position specified by the specifying step; and receiving a multicast communication for a multicast group identified by the address information used by the controlling step.

According to another aspect of the present invention there is provided a method of multicast communication for receiving a desired multicast communication of a desired communication quality from a server through a network by specifying the desired communication quality, comprising the steps of: displaying on a screen a virtual space with a plurality of zones defined therein in correspondence to a plurality of different communication qualities; specifying a desired position in the virtual space on the screen displayed by the displaying step; controlling a communication quality of a multicast communication to be received according to a zone in the virtual space which contains the desired position specified by the specifying step; and receiving a multicast communication of a communication quality as controlled by the controlling step.

According to another aspect of the present invention there is provided a method of multicast communication for receiving a desired multicast communication for a desired multicast group from a server through a network by joining to the desired multicast group, comprising the steps of: displaying on a screen a virtual space with a plurality of regions defined therein in correspondence to a plurality of multicast groups, and an information concerning each multicast group allocated to each region in relation to a display of each region; specifying a desired position in the virtual space on the screen; displaying an icon representing a multicast communication receiving side end point on the screen at the desired position specified by the specifying step; controlling a joining to a multicast group allocated to a region in the virtual space which corresponds to the desired position on the screen at which the icon is displayed; and receiving a multicast communication for a multicast group with respect to which the joining is controlled by the controlling step.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 8, one embodiment of a multicast communication system implementing a multicast communication method according to the present invention will be described in detail.

Figure 1:
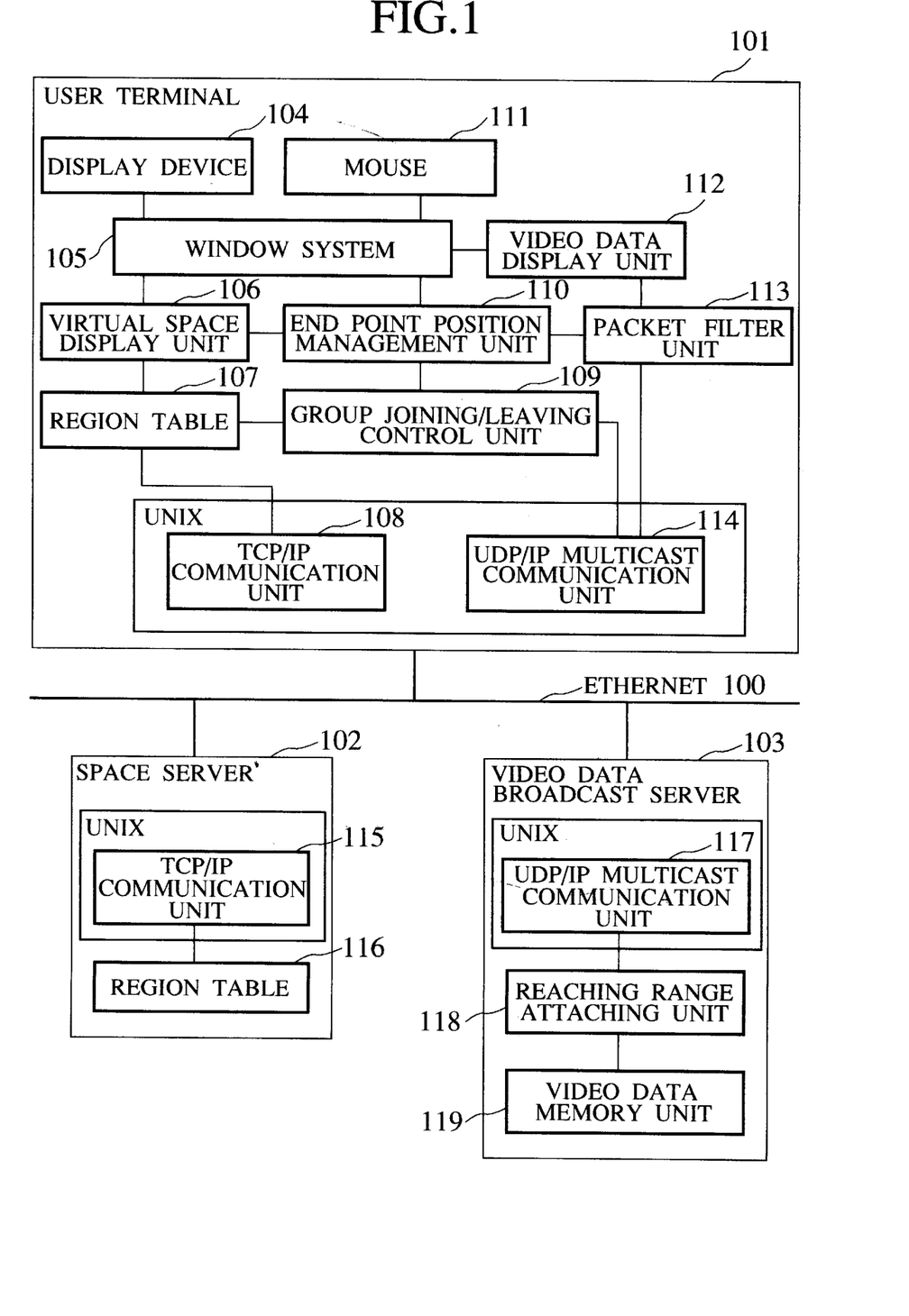
FIG. 1 is a block diagram of a multicast communication system according to one embodiment of the present invention.

The multicast communication system according to this system has a basic configuration as shown in FIG. 1, which generally comprises a user terminal 101, a space server 102 and video data broadcast server 103, which are interconnected through a network 100.

FIG. 1 shows only one user terminal 101 for the sake of simplicity, but a plurality of similar user terminals 101 are to be actually provided on the network in general. One space server 102 is to be provided in correspondence to each virtual space as will be described below, while one or more video data broadcast server 103 may be provided on the network.

In this embodiment, the UNIX operating system is mounted on the user terminal 101, and the network 100 is provided in a form of the Ethernet.

The user terminal 101 is used for receiving the video data broadcast service from the video data broadcast server 103. As shown in FIG. 1, this user terminal 101 includes: a window system 105; a display device 104, a mouse 111, and a video data display unit 112 which are connected with the window system 105; a virtual space display unit 106 and an end point position management unit 110 which are connected with each other as well as with the window system 105; a region table 107 connected with the virtual space display unit 105; a TCP/IP communication unit 108 which is provided as a part of UNIX and connected with the region table 107; a group joining/leaving control unit 109 connected with the region table 107 and the end point position management unit 110; a packet filter unit 113 connected with the end point position management unit 110 and the video data display unit 112; and a UDP/IP multicast communication unit 114 which is provided as a part of UNIX and connected with the group joining/leaving control unit 109 and the packet filter unit 113. These elements of the user terminal 101 may be provided in a form of hardware structure, or a software program for realizing the equivalent functions by being installed and executed on a computer.

The space server 102 manages a virtually defined two-dimensional or three-dimensional space (virtual space) that is to be utilized in controlling the multicast communication, and includes a TCP/IP communication unit 115 provided as a part of UNIX, and a region table 116 connected with the TCP/IP communication unit 115.

The video data broadcast server 103 broadcasts video data to the participating user terminal 101, and includes a UDP/IP multicast communication unit 117 provided as a part of UNIX, a reaching range attaching unit 118 connected with the UDP/IP multicast communication unit 117, and a video data memory unit 119 connected with the reaching range attaching unit 118.

Note that the packet filter unit 113 of the user terminal 101 and the reaching range attaching unit 118 of the video data broadcast server 103 are necessary in controlling qualities of the multicast communications as will be described below. Consequently, the packet filter unit 113 may be omitted in the user terminal 101 when the quality control is not required at this user terminal 101. In addition, the quality control itself may be omitted in the system, in which case the packet filter unit 113 can be omitted in every user terminal 101 and the reaching range attaching unit 118 can be omitted in every video data broadcast server 103 in the system.

Figure 2:
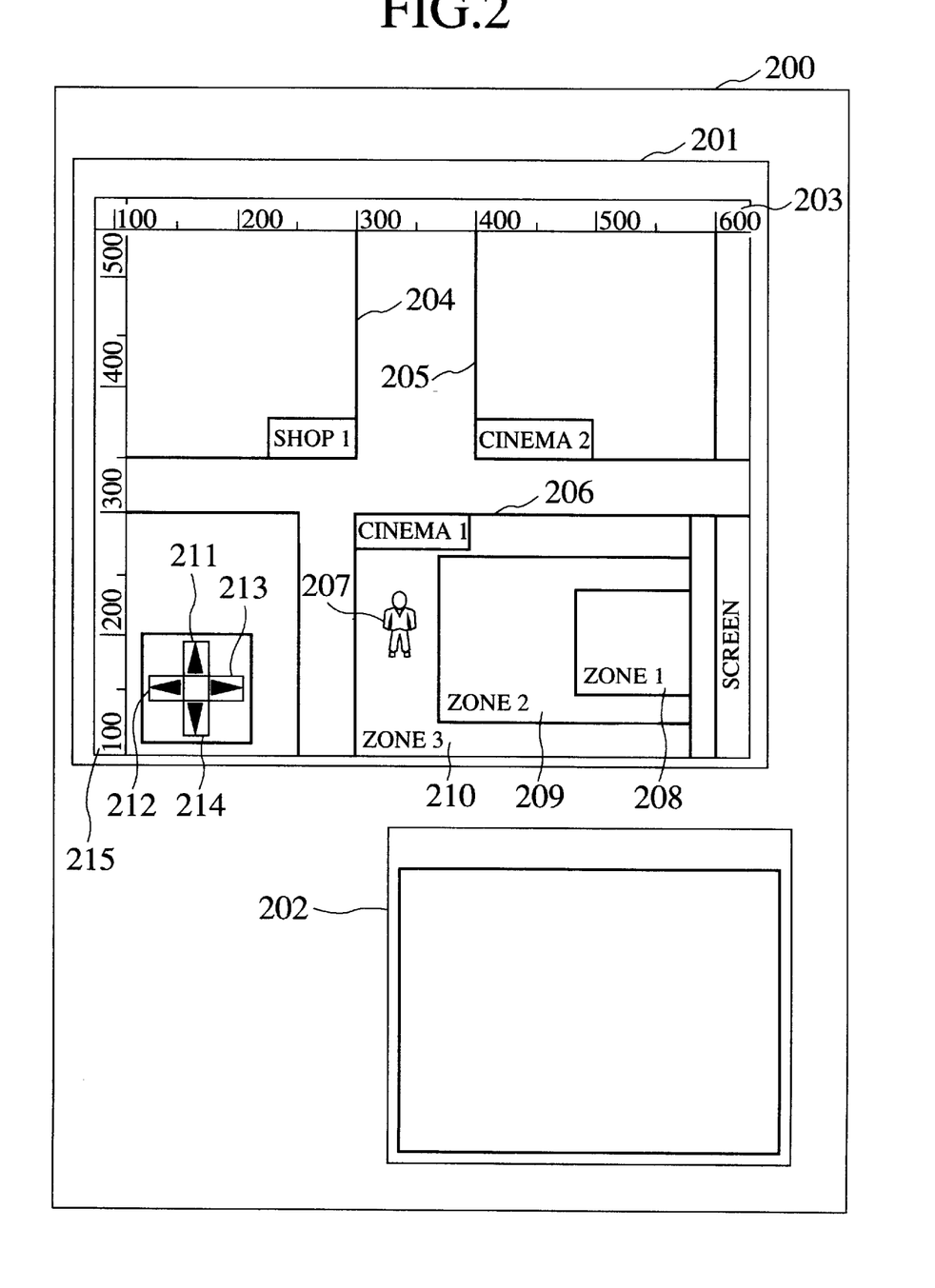
FIG. 2 is an illustration of an exemplary display used at a user terminal in the multicast communication system of FIG. 1.

FIG. 2 shows an exemplary appearance of a screen 200 displayed on the display device 104 in the user terminal 101. Here, the screen 200 has two windows including a space window 201 displayed by the virtual space display unit 106 and a video data window 202 displayed by the video data display unit 112.

The space window 201 is used for presenting information to a user and enabling user's input operations, while the video data window 202 is used for displaying the video data transferred from the video data broadcast server 103.

Now, the space window 201 will be described in further detail.

The space window 201 presents the two-dimensional or three-dimensional virtual space to a user. In this embodiment, a case of using the two-dimensional virtual space will be described. Scales 203 and 215 provided at upper and left edges of the space window 201 indicate X-and Y-coordinates in this two-dimensional virtual space, respectively.

This virtual space is divided into several regions such as a "cinema1" region 206, a "cinema2" region 205, and a "shop1" region 204. Each region defined in the virtual space corresponds to one multicast group. Inside each region (or in a vicinity of each region), a character string representing a name of that region (or information for identifying each multicast group) is displayed. Here, it is possible to expand or contract a range of the virtual space displayed on the space window 201 according to a command from a user, if desired.

In the space window 201, there is provided an icon (end point icon) 207 which can be moved freely within the virtual space. This icon 207 represents an end point (socket) of a communication for a user. Each user can move the icon 207 representing his own socket in any desired direction by clicking by the mouse 111 any of four moving buttons 211 to 214 which are indicating four directions (up, down, left, and right) and provided at a lower corner of the space window 201.

As already mentioned, the regions existing on the virtual space such as "cinema1" region, "cinema2" region, and "shop1" region are in correspondence to the respective multicast groups, and a user can control the joining to a desired multicast group (and the leaving from any multicast group to which this user has been joining) by positioning the icon 207 representing his own end point inside a desired region.

Figure 3:
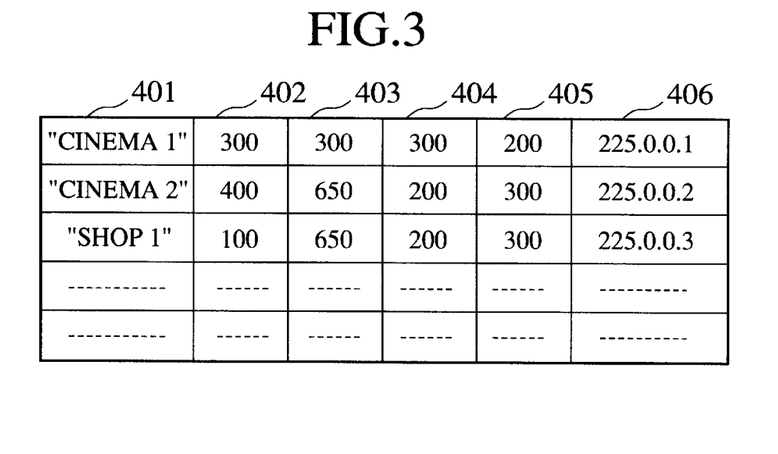
FIG. 3 is a diagram showing an exemplary format of a region table used in the multicast communication system of FIG. 1.

The definitions of the regions existing on the virtual space are stored in the region table 116 of the space server 102. FIG. 3 shows an exemplary format of this region table 116. As shown in FIG. 3, each entry of the region table 116 is formed by six fields 401 to 406. The first field 401 registers a character string representing a name of a region. Also, as shown in FIG. 2, each region is expressed as a rectangle which can be specified by four values of coordinates (x, y) of an upper right vertex, a width, and a height of a rectangular region occupied. Then, in each entry of the region table 116 of FIG. 3, the second field 402 registers an X-coordinate value of the upper left vertex of a region, the third field 403 registers a Y-coordinate value of the upper left vertex of a region, the fourth field 404 registers a width of a region, and the fifth region 405 registers a height of a region. In addition, the sixth region 406 registers a multicast address corresponding to a region.

Note that a shape of a region defined in the virtual space is not necessarily limited to a rectangle, and any other desired shapes may be used if desired. For instance, in a case of using a circular region, it suffices to define this circular region by specifying a radius and coordinates of a center of this circular region. It is also possible to use a shape which cannot be defined by the parametric expression. In such a case, it suffices to register coordinates of boundary lines of a region, for example.

The content of the region table 116 stored on the space server 102 is copied to the region table 107 on the user terminal 101 in order to make an access to the region table more efficiently from an execution subject such as a program on the user terminal 101. This copying is to be executed at a timing of activation or start of the execution subject by the user, and the transmission of the table content is realized by using the TCP/IP communication units 108 and 115 provided by the UNIX operating systems.

Figure 4:
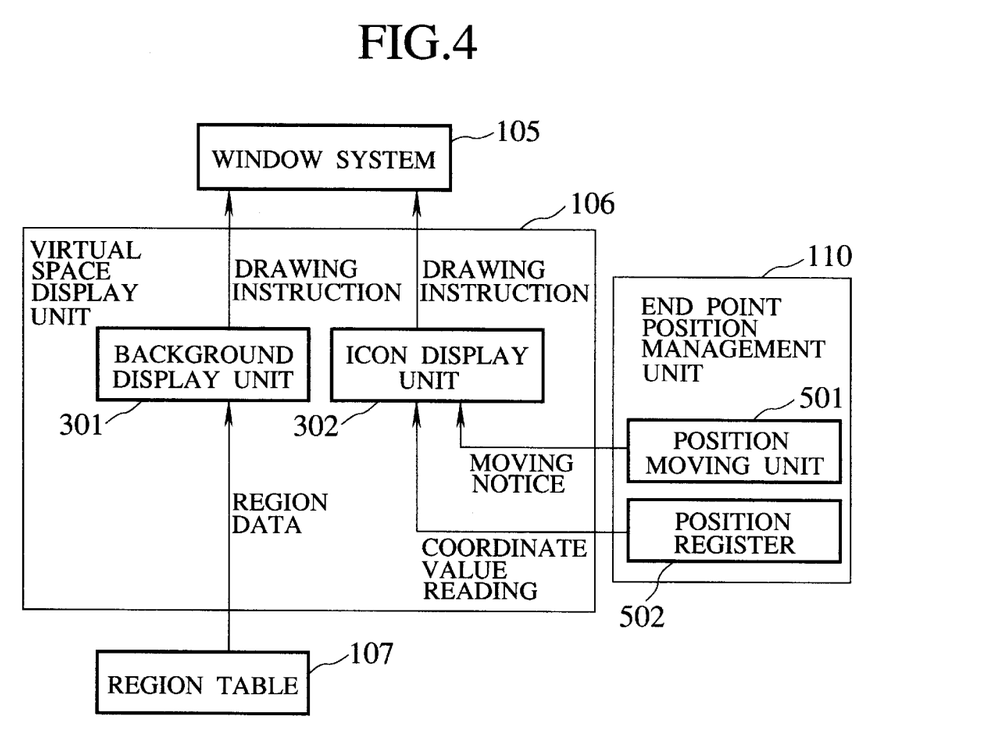
FIG. 4 is a block diagram showing an exemplary internal configuration of a virtual space display unit in the multicast communication system of FIG. 1.
Figure 5:
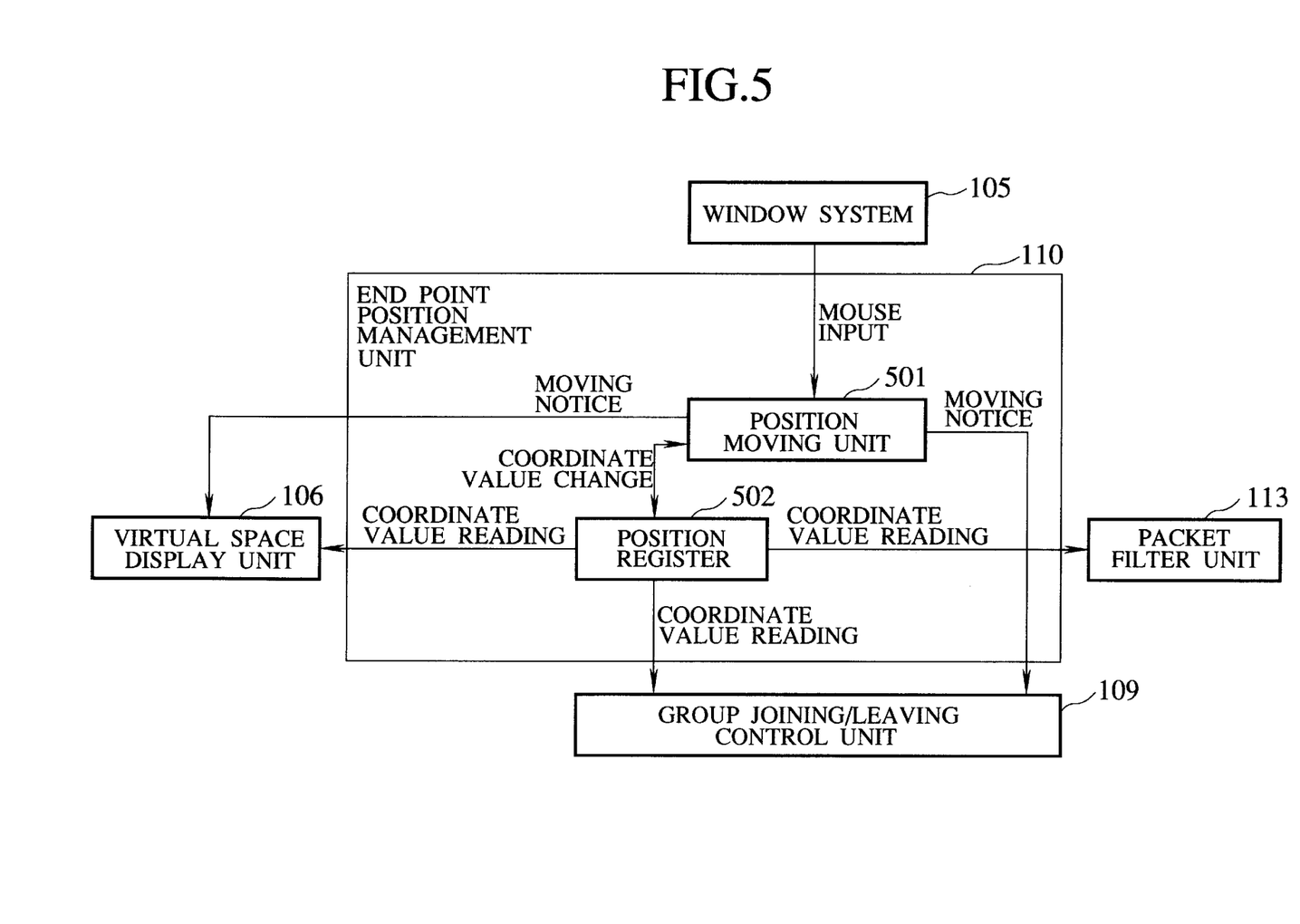
FIG. 5 is a block diagram showing an exemplary internal configuration of an end point position management unit in the multicast communication system of FIG. 1.

Next, FIG. 4 shows an exemplary internal configuration of the virtual space display unit 106 in the user terminal 101, while FIG. 5 shows an exemplary internal configuration of the end point position management unit 110 in the user terminal 101.

The virtual space display unit 106 presents the virtual space to the user, and includes a background display unit 301 connected with the region table 107 and the window system 105, and an icon display unit 302 connected with the end point position management unit 110 and the window system 105.

The end point position management unit 110 is for positioning the end point of a communication inside the virtual space, and includes a position moving unit 501 connected with the window system 105, the virtual space display unit 106, and the group joining/leaving control unit 109, and a position register 502 connected with position moving unit 501, the virtual space display unit 106, the group joining/leaving control unit 109, and the packet filter unit 113.

The background display unit 301 of the virtual space display unit 106 displays boundary lines of regions and names of regions on a screen as shown in FIG. 2. Here, the boundary lines and names are drawn by reading information on size, position, and name of each region from the region table 107.

The icon display unit 302 of the virtual space display unit 106 displays the icon 207 representing an end point of a communication for a user, in superposition to the background displayed by the background display unit 301, as shown in FIG. 2.

A position of the icon 207 is registered in the position register 502 inside the end point position management unit 110, and the icon display unit 302 reads the registered value from this position register 502, and draws the icon at a corresponding position on the space window 201.

The position register 502 of the end point position management unit 110 registers the position of the end point inside the virtual space in terms of its X- and Y-coordinates.

An operation of the moving buttons 211 to 214 shown in FIG. 2 by the user is entered into the position moving unit 501 through the window system 105. At the position moving unit 501, the value registered in the position register is changed according to which moving button has been clicked by the user. More specifically, when the user clicked the up direction moving button 211, a prescribed increment is added to the Y coordinate value registered in the position register 502, whereas when the user clicked the down direction moving button 214, a prescribed decrement is subtracted from the Y coordinate value registered in the position register 502. Similarly, when the user clicked the right direction moving button 213, a prescribed increment is added to the X-coordinate value registered in the position register 502, whereas when the user clicked the left direction moving button 212, a prescribed decrement is subtracted from the X-coordinate value registered in the position register 502.

After the registered value in the position register 502 is changed, the position moving unit 501 notifies this change to the icon display unit 302 of the virtual space display unit 106 and the group joining/leaving control unit 109. The icon display unit 302 of the virtual space display unit 106 then moves the position of the icon 207 displayed on the screen according to this notice.

The registered value of the position register 502 can also be read by the group joining/leaving control unit 109 and the packet filter unit 113 as will be described below.

Note that it is also possible to specify a moving destination of the icon 207 directly by the mouse 111 instead of moving the icon 207 by operating the moving buttons 211 to 214. In such a case, it suffices for the position register 502 to register the coordinates of a position specified by the mouse 111.

Also, instead of using the mouse, any other input device, such as a keyboard, may be used, if desired.

Figure 6:
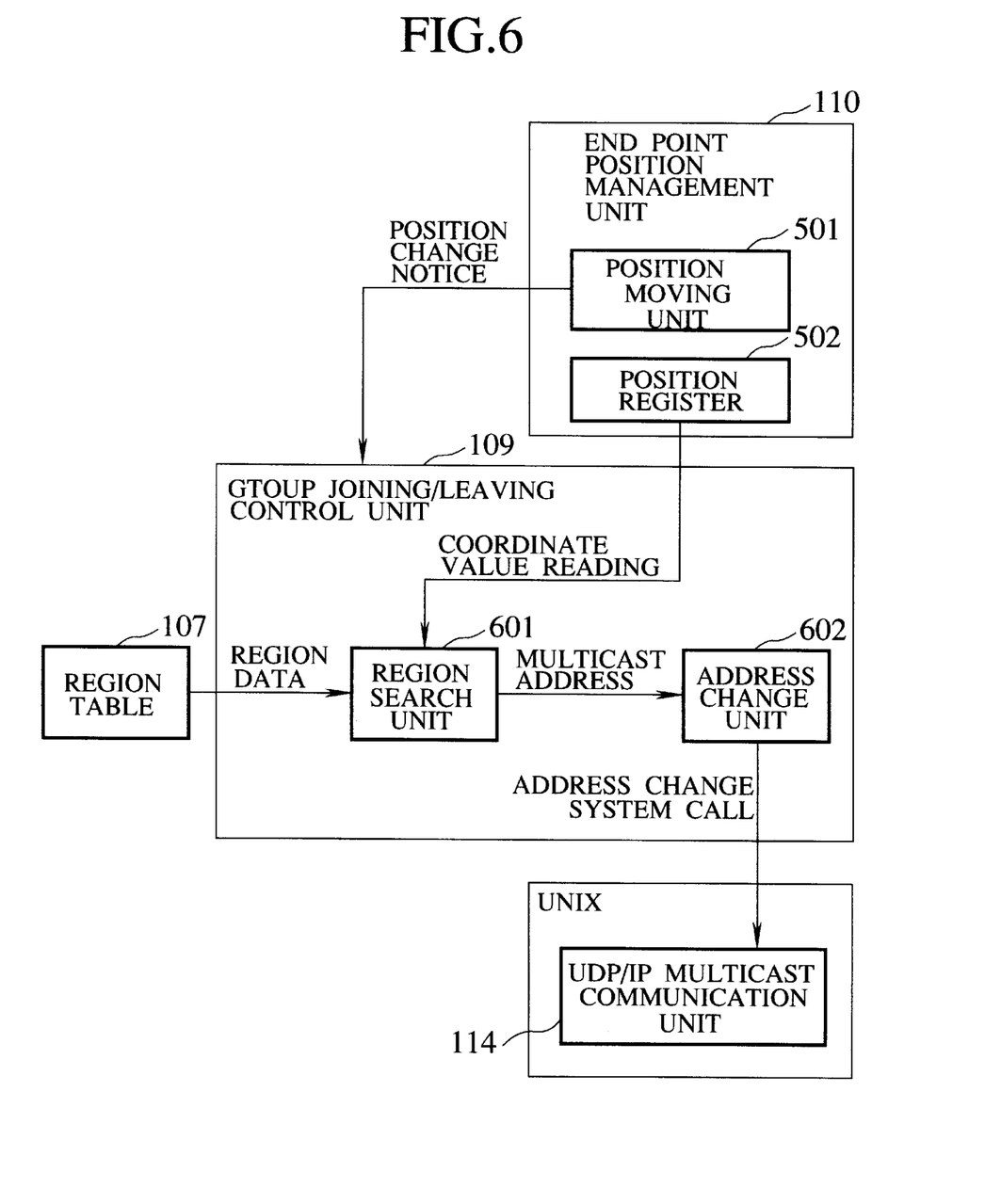
FIG. 6 is a block diagram showing an exemplary internal configuration of a group joining/leaving control unit in the multicast communication system of FIG. 1.

Next, FIG. 6 shows an exemplary internal configuration of the group joining/leaving control unit 109 in the user terminal 101.

The group joining/leaving control unit 109 controls joining to or leaving from the multicast group corresponding to a region of the end point, according to a True/False value indicating whether a position of the end point is included within each region or not. This group joining/leaving control unit 109 includes a region search unit 601 connected with the region table 107 and the position register 502 of the end point position management unit 110, and an address change unit 602 connected with the region search unit 601 and the UDP/IP multicast communication unit 114.

The group joining/leaving control unit 109 executes the following processing upon receiving the moving notice from the position moving unit 501. First, at the region search unit 601, within which region the end point is positioned is searched. Here, the region search unit 601 evaluates the following logic formula for each entry in the region table 107.

$$(0 \leq (Ex-Rx) < Rw) \& (0 \leq (Ey-Ry) < Rh)$$

where Rx, Ry, Rw, and Rh are values registered in the second to fifth fields 402 to 405 of each entry of the region table 107, Ex and Ey are X- and Y-coordinate values registered in the position register 502, and "&" is a logical product operation symbol. The region search unit 601 then enters the value in the sixth field 406 of the region table entry for which the evaluation result of the above logic formula is True, into the address change unit 602.

The address change unit 602 then issues a system call to the UDP/IP multicast communication unit 114 inside UNIX so as to change the address of the socket to the value obtained from the region search unit 601. By this processing, the socket leaves from the multicast group to which it has been joining up to this point, and joins the new multicast group obtained as a result of the region search.

Note that this control of group joining/leaving may be carried out in response to the change of the region in which the icon 207 is positioned, or upon receiving an explicit command from a user.

As described, according to this embodiment, what kinds of multicast sessions are existing in the network can be visually expressed, so that it becomes easier for a user to comprehend this information. In addition, the joining to and leaving from the multicast groups can be realized by a simple operation to move the icon by a mouse on the visually expressed virtual space, so that it becomes easier for a user to do this operation.

In addition, when the information on participants of each multicast group is obtained from the network and displayed in a corresponding region of the space window 201, it becomes easier for a user to comprehend what kinds of users are participating in each multicast session. Here, the information on participants may be displayed all the times, or displayed/erased according to a command from a user. As for a format for displaying the information on participants, a display of a list of names of participants may be used, or a display of icons representing individual participants may be used.

In a case of displaying icons, it is preferable to use different shapes and/or colors for different icons so that each icon can be identified uniquely. In addition, for the multicast group in which the quality can be specified, each icon can be displayed at a position reflecting the quality information for each participant.

Next, the control of the qualities of the multicast communications in this embodiment will be described.

In the virtual space shown in FIG. 2, the "cinema1" region 206 is a region corresponding to the multicast group to which the video data are to be transmitted from the video data broadcast server 103, and this "cinema1" region 206 is further divided into three zones including a "zone1" 208, a "zone2" 209, and a "zone3" 210, as indicated in FIG. 2.

According to this embodiment, a user can control the quality of the multicast communication to be received by positioning the icon 207 representing his own end point in the virtual space, into a desired of these zones. For instance, the video data can be provided at the first quality of 30 frames per second for the end point positioned in the "zone1", or at the second quality of 15 frames per second for the end point positioned in the "zone2", or at the third quality of 7.5 frames per second for the end point positioned in the "zone3".

This quality control can be realized by filtering the packets according to the position of the icon 207 in the virtual space. Namely, all the frames of the video data outputted from the video data memory unit 119 are presented to the user whose end point is positioned in the "zone1", whereas one frame in every two frames of the video data outputted from the video data memory unit 119 is picked up and presented to the user whose end point is positioned in the "zone 2", and one frame in every four frames of the video data outputted from the video data memory unit 119 is picked up and presented to the user whose end point is positioned in the "zone3".

Now, the packet filtering used in this embodiment will be described in further detail.

The reaching range attaching unit 118 in the video data broadcast server 103 attaches a header indicating a reaching range in the virtual space to a packet transmitted from the end point.

Figure 7:
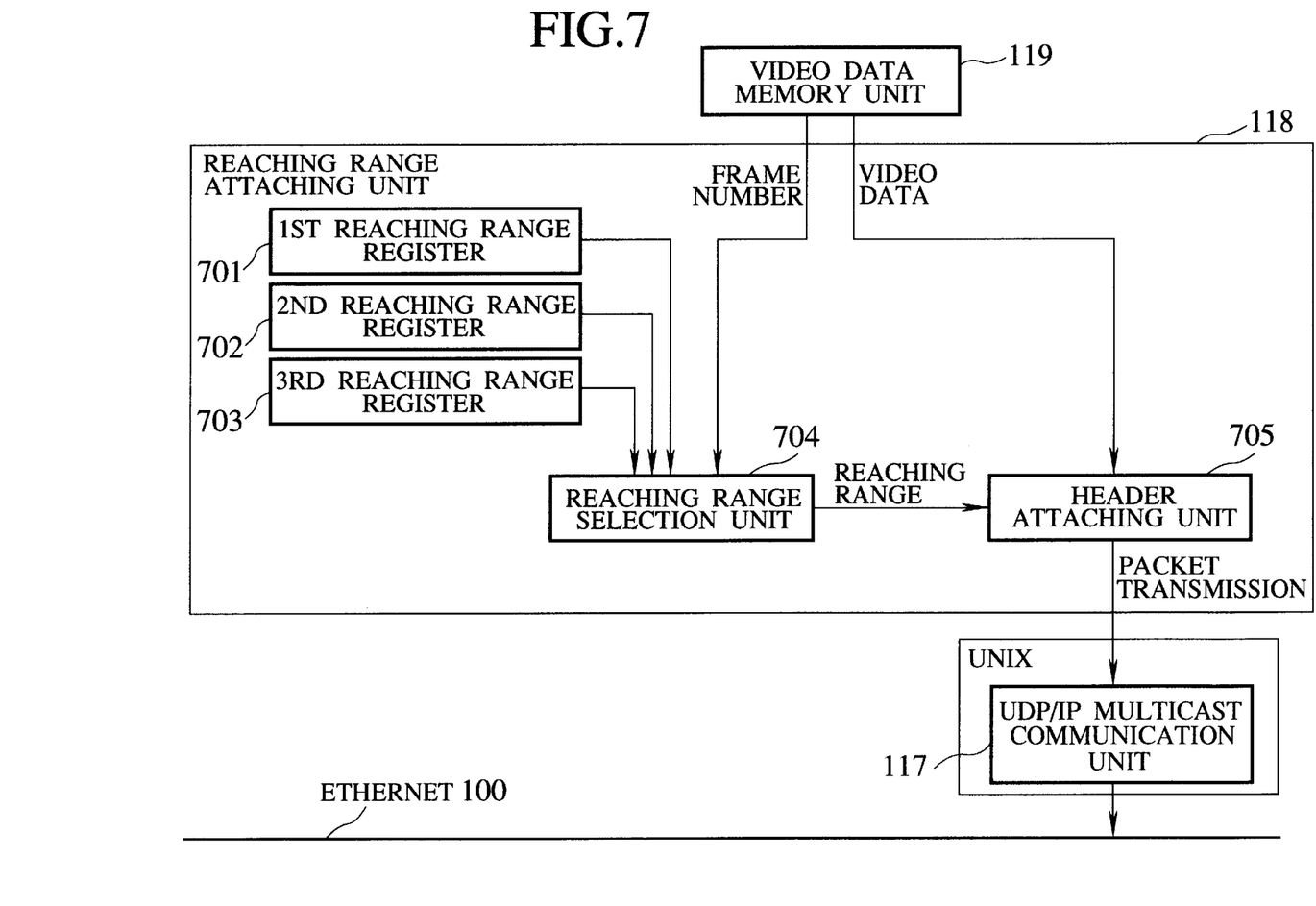
FIG. 7 is a block diagram showing an exemplary internal configuration of a reaching range attaching unit in the multicast communication system of FIG. 1.

FIG. 7 shows an exemplary internal configuration of the reaching range attaching unit 118 in the video data broadcast server 103. This reaching range attaching unit 118 includes a first reaching range register 701, a second reaching range register 702, a third reaching range register 703, a reaching range selection unit 704 connected with the reaching range registers 701 to 703 and the video data memory unit 119, and a header attaching unit 705 connected with the reaching range selection unit 704, the video data memory unit 119, and the UDP/IP multicast communication unit 117 of UNIX.

Three reaching range registers 701 to 703 correspond to three different image qualities described above, and register ranges of the respective zones for which each video frame is to be transmitted by the multicast. Namely, the first reaching range register 701 registers a range of the "zone1" in FIG. 2, in terms of width, height, and upper left vertex coordinates of the "zone1". The second reaching range register 702 registers a range encompassing the "zone1" and "zone2" in FIG. 2, in terms of width, height, and upper left vertex coordinates of that range. The third reaching range register 703 registers a range encompassing all of the "zone1", "zone2", and "zone3" in FIG. 2, in terms of width, height, and upper left vertex coordinates of that range.

The video frames are sequentially numbered by frame numbers, starting from 0 for a top of the video sequence, and the reaching range selection unit 704 selects one of the reaching range registers 701 to 703 according to the frame number of each video frame. More specifically, the third reaching range register 703 is selected for the video frame whose frame number is a multiple of 4, while the second reaching range register 702 is selected for the video frame whose frame number is a multiple of 2 but not a multiple of 4, and the first reaching range register 701 is selected for the video frame whose frame number is neither a multiple of 2 nor a multiple of 4.

Then, the reaching range indicated by the selected reaching range register is entered from the reaching range selection unit 704 into the header attaching unit 705, and attached to the video data as a header at the header attaching unit 705.

By the processing up to this point, the range encompassing "zone1", "zone2", and "zone3" is attached to the frame whose frame number is 4n (where n is an integer not less than zero), the range encompassing "zone1" and "zone2" is attached to the frame whose frame number is 4n+2, and the range of "zone1" is attached to the frame whose frame number is 4n+1 or 4n+3.

The packets to which the reaching ranges are attached in the above manner are then written into the socket for the multicast. At this point, the multicast address corresponding to the "cinema1" region is specified as a destination. The network system formed by the UDP/IP multicast communication unit 117 inside UNIX kernel and the Ethernet 100 then transmits these packets to the end points (sockets on the user terminals) which are participating in the multicast group of the specified address.

Figure 8:
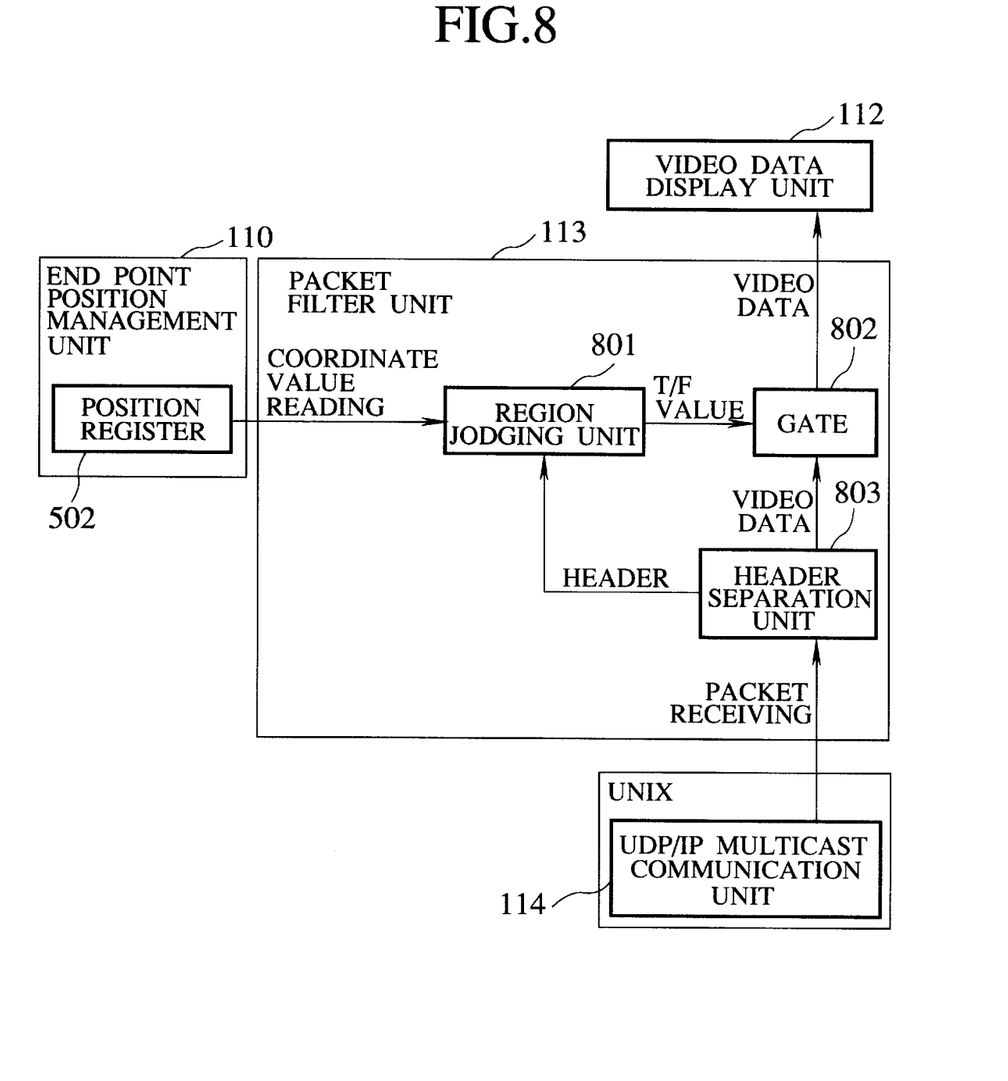
FIG. 8 is a block diagram showing an exemplary internal configuration of a packet filter unit in the multicast communication system of FIG. 1.

FIG. 8 shows an exemplary internal configuration of the packet filter unit 113 in the user terminal 101.

The packet filter unit 113 carries out the filtering of the packets according to a True/False value indicating whether the position of the end point is included within a range indicated by a header of a packet received at the socket or not. This packet filter unit 113 includes a region judging unit 801 connected with the position register 502 of the end point position management unit 110, a header separation unit 803 connected with the UDP/IP multicast communication unit 114 of UNIX and the region judging unit 801, and a gate 802 connected with the region judging unit 801, the header separation unit 803, and the video data display unit 112.

The video data packet received at the multicast end point is read out from a buffer inside the UNIX kernel by the header separation unit 803. Then the packet content is separated into the header and the video data, and the header is entered in to the region judging unit 801, while the video data is entered into the gate 802.

At the region judging unit 801, whether the position of the end point of the user registered in the position register 502 is included within the reaching range indicated in the header or not is judged. Here, the region judging unit 801 makes the judgement by evaluating the following logic formula.

$$(0 \leq (Ex-Rx) < Rw) \& (0 \leq (Ey-Ry) < Rh)$$

where Rx, Ry, Rw, and Rh are left upper vertex coordinates, width, and height values of the reaching range indicated in the header, Ex and Ey are X- and Y-coordinate values registered in the position register 502, and "&" is a logical product operation symbol.

The region judging unit 801 then enters a True/False value indicating the evaluation result of the above logic formula into the gate 802.

At the gate 802, the packets are accepted or rejected according to the True/False value indicating the evaluation result obtained at the region judging unit 801. When the evaluation result of the region judging unit 801 is True, the gate 802 accepts the packet and enters the video data of this packet into the video data display unit 112. On the other hand, when the evaluation result of the region judging unit 801 is False, the gate 802 rejects the packet and discard the video data of this packet without entering it into the video data display unit 112.

The video data display unit 112 then displays the entered video data at the video data display window 202 on the display device 104 through the window system 105.

Note that, instead of transferring the reaching range from the video data broadcast server 103 to the user terminal 101, it is also possible to store the reaching ranges and their identification information in correspondence in the user terminal 101, and transfer the identification information from the video data broadcast server 103 to the user terminal 101, such that the user terminal 101 can obtain the reaching range from the identification information transferred from the video data broadcast server 103.

Alternatively, it is also possible for the user terminal 101 to obtain in advance a zone type of the zone at which the icon 207 of FIG. 2 is positioned, and for the video data broadcast server 103 to transfer each packet by writing zone types to be accepted at the user terminal side in the header of each packet, such that the user terminal 101 can accept the packet only when the zone type of the zone at which the icon 207 is positioned is written in the header of that packet.

As described, according to this embodiment, the packets to be received by each user terminal can be selected according to the position of the icon on the screen, so that the user can control the quality of the multicast communication to be received.

It is to be noted that the above described embodiment is directed to an exemplary case in which one user terminal 101 has one multicast communication end point, but the present invention is equally applicable to a case in which one user terminal 101 is allowed to have a plurality of multicast communication end points.

It is also to be noted that the above described embodiment uses the user terminal 101 on which the UNIX operating system is mounted, and the network 100 in a form of the Ethernet, but the present invention is also applicable to a case using the other type of OS and the other type of network.

It is also to be noted that the above described embodiment is directed to an exemplary case of receiving the video data broadcast from the video data broadcast server 103, but data to be broadcast can be any other type of data such as speech data and text data.

It is also to be noted that the present invention is equally applicable to the multicast communication system in which more than one types of data such as video data and speech data are to be broadcast simultaneously. In such a case, the quality control described above may be carried out for each media separately.

As described, according to the present invention, the multicast groups are set in correspondence to regions defined in a virtual space, and the presentation of the information concerning the multicast groups to the user as well as the user's input operation are realized through the display screen of the virtual space, so that the multicast groups can be presented in a spatial and visual format and it becomes easier for the user to comprehend the information concerning the multicast groups.

In addition, the joining to and/or the leaving from the multicast group as well as the quality of the multicast communication to be received can be specified by a simple operation to specify a region, such as a moving of an icon by a mouse, on that virtual space presented in a spatial and visual format, so that it becomes easier for the user to operate the multicast communication system.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A multicast communication system for receiving a desired multicast communication for a desired multicast group from a server through a network by joining/leaving to/from multicast groups, comprising:

a display device configured to display on a screen a virtual space with a plurality of regions defined therein in correspondence to a plurality of multicast groups;

a memory unit communicatively connected to the display device and configured to store an information indicating a range of each region in the virtual space in correspondence to an address information for a corresponding multicast group;

an input device communicatively connected to the display device and configured to specify a desired position in the virtual space on the screen displayed by the display device;

a control unit communicatively connected to the memory unit and the display device and configured to control joining/leaving to/from multicast groups by using the address information stored by the memory unit in correspondence to a region in the virtual space which contains the desired position specified by the input device; and a communication unit communicatively connected to the control unit and the network and configured to receive a multicast communication for a multicast group identified by the address information used by the control unit.

2. The system of claim 1, wherein:

the display device displays on the screen the virtual space with a plurality of zones defined within each region in correspondence to a plurality of different communication qualities;

the control unit also controls a communication quality of a multicast communication to be received according to a zone within a region in the virtual space which contains the desired position specified by the input device; and the communication unit receives a multicast communication of a communication quality as controlled by the control unit.

3. The system of claim 2, wherein:

an information indicating a range of at least one zone within a region in the virtual space is attached as a header to each packet of the multicast communication transmitted from the server; and the control unit controls the communication quality of the multicast communication to be received by filtering packets of the multicast communication according to the header of each packet and a zone within a region in the virtual space which contains the desired position specified by the input device.

4. The system of claim 1, wherein:

the display device also displays on the screen an information concerning each multicast group allocated to each region in relation to a display of each region.

5. The system of claim 4, wherein:

the display device also displays an icon representing a multicast communication receiving side end point at the desired position specified by the input device;

the control unit controls a joining to a multicast group allocated to a region in the virtual space which corresponds to the desired position on the screen at which the icon is displayed by the display device; and the communication means receives a multicast communication for a multicast group with respect to which the joining is controlled by the control unit.

6. The system of claim 1, wherein the display device, the memory unit, the input device, the control unit and the communication unit are all included within a user terminal communicatively coupled to the server through the network, the system further comprising:

a video data server communicatively coupled to the user terminal through the network and configured to provide video data to the user terminal, wherein the display device is configured to display the virtual space with the plurality of regions in a first region of the display, and to display video data on a second region of the display that is separate from the first region.

7. The system of claim 6, further comprising a second memory unit located within the server, wherein the second memory unit provides information indicating the range of each region in the virtual space to the memory unit included within the user terminal at a time corresponding to one of activation and start of execution by a user at the user terminal.

8. The system of claim 7, wherein the user is capable of defining a different quality of service for different multicast groups by assigning each of the different multicast groups to different regions in the virtual space by operation of the input device.

9. A multicast communication system for receiving a desired multicast communication of a desired communication quality from a server through a network by specifying the desired communication quality, comprising:

a display device for displaying on a screen a virtual space with a plurality of zones defined therein in correspondence to a plurality of different communication qualities;

an input device for specifying a desired position in the virtual space on the screen displayed by the display device;

a control unit for controlling a communication quality of a multicast communication to be received according to a zone in the virtual space which contains the desired position specified by the input device; and a communication unit for receiving a multicast communication of a communication quality as controlled by the control unit.

10. The system of claim 9, wherein:

an information indicating a range of at least one zone in the virtual space is attached as a header to each packet of the multicast communication transmitted from the server; and the control unit controls the communication quality of the multicast communication to be received by filtering packets of the multicast communication according to the header of each packet and a zone in the virtual space which contains the desired position specified by the input device.

11. The system of claim 9, wherein:

the display device displays on the screen the virtual space with a plurality of regions defined therein in correspondence to a plurality of multicast groups, and an information concerning each multicast group allocated to each region in relation to a display of each region.

12. The system of claim 11, wherein:

the display device also displays an icon representing a multicast communication receiving side end point at the desired position specified by the input device;

the control unit also controls a joining to a multicast group allocated to a region in the virtual space which corresponds to the desired position on the screen at which the icon is displayed by the display device; and the communication unit receives a multicast communication for a multicast group with respect to which the joining is controlled by the control unit.

13. A multicast communication system for receiving a desired multicast communication for a desired multicast group from a server through a network by joining to the desired multicast group, comprising:

a display device configured to display on a screen a virtual space with a plurality of regions defined therein in correspondence to a plurality of multicast groups, and an information concerning each multicast group allocated to each region in relation to a display of each region;

an input device communicatively connected to the display device and configured to specify a desired position in the virtual space on the screen displayed by the display device;

an icon display unit communicatively connected to the display device and the input device and configured to display an icon representing a multicast communication receiving side end point on the screen displayed by the display device at the desired position specified by the input device;

a control unit communicatively connected to the memory unit and the display device and configured to control a joining to a multicast group allocated to a region in the virtual space which corresponds to the desired position on the screen at which the icon is displayed by the icon display unit; and a communication unit communicatively connected to the control unit and the network and configured to receive a multicast communication for a multicast group with respect to which the joining is controlled by the control unit.

14. A method of multicast communication for receiving a desired multicast communication for a desired multicast group from a server through a network by joining/leaving to/from multicast groups, comprising the steps of:

displaying on a screen a virtual space with a plurality of regions defined therein in correspondence to a plurality of multicast groups;

storing an information indicating a range of each region in the virtual space in correspondence to an address information for a corresponding multicast group;

specifying a desired position in the virtual space on the screen displayed by the displaying step;

controlling joining/leaving to/from multicast groups by using the address information stored by the storing step in correspondence to a region in the virtual space which contains the desired position specified by the specifying step; and     receiving a multicast communication for a multicast group identified by the address information used by the controlling step.

15. The method of claim 14, wherein:

the displaying step displays on the screen the virtual space with a plurality of zones defined within each region in correspondence to a plurality of different communication qualities;

the controlling step also controls a communication quality of a multicast communication to be received according to a zone within a region in the virtual space which contains the desired position specified by the specifying step; and the receiving step receives a multicast communication of a communication quality as controlled by the controlling step.

16. The method of claim 15, wherein:

an information indicating a range of at least one zone within a region in the virtual space is attached as a header to each packet of the multicast communication transmitted from the server; and the controlling step controls the communication quality of the multicast communication to be received by filtering packets of the multicast communication according to the header of each packet and a zone within a region in the virtual space which contains the desired position specified by the specifying step.

17. The method of claim 14, wherein:

the displaying step also displays on the screen an information concerning each multicast group allocated to each region in relation to a display of each region.

18. The method of claim 17, wherein:

the displaying step also displays an icon representing a multicast communication receiving side end point at the desired position specified by the specifying step;

the controlling step controls a joining to a multicast group allocated to a region in the virtual space which corresponds to the desired position on the screen at which the icon is displayed by the displaying step; and the receiving step receives a multicast communication for a multicast group with respect to which the joining is controlled by the controlling step.

19. A method of multicast communication for receiving a desired multicast communication of a desired communication quality from a server through a network by specifying the desired communication quality, comprising the steps of:

displaying on a screen a virtual space with a plurality of zones defined therein in correspondence to a plurality of different communication qualities;

specifying a desired position in the virtual space on the screen displayed by the displaying step;

controlling a communication quality of a multicast communication to be received according to a zone in the virtual space which contains the desired position specified by the specifying step; and     receiving a multicast communication of a communication quality as controlled by the controlling step.

20. The method of claim 19, wherein:

an information indicating a range of at least one zone in the virtual space is attached as a header to each packet of the multicast communication transmitted from the server; and the controlling step controls the communication quality of the multicast communication to be received by filtering packets of the multicast communication according to the header of each packet and a zone in the virtual space which contains the desired position specified by the specifying step.

21. The method of claim 19, wherein:

the displaying step displays on the screen the virtual space with a plurality of regions defined therein in correspondence to a plurality of multicast groups, and an information concerning each multicast group allocated to each region in relation to a display of each region.

22. The method of claim 21, wherein:

the displaying step also displays an icon representing a multicast communication receiving side end point at the desired position specified by the specifying step;

the controlling step also controls a joining to a multicast group allocated to a region in the virtual space which corresponds to the desired position on the screen at which the icon is displayed by the displaying step; and the receiving step receives a multicast communication for a multicast group with respect to which the joining is controlled by the controlling step.

23. A method of multicast communication for receiving a desired multicast communication for a desired multicast group from a server through a network by joining to the desired multicast group, comprising the steps of:

displaying on a screen a virtual space with a plurality of regions defined therein in correspondence to a plurality of multicast groups, and an information concerning each multicast group allocated to each region in relation to a display of each region;

specifying a desired position in the virtual space on the screen;

displaying an icon representing a multicast communication receiving side end point on the screen at the desired position specified by the specifying step;

controlling a joining to a multicast group allocated to a region in the virtual space which corresponds to the desired position on the screen at which the icon is displayed; and     receiving a multicast communication for a multicast group with respect to which the joining is controlled by the controlling step.

\* \* \* \* \*